US009097797B2

(12) United States Patent
Abe

(10) Patent No.: US 9,097,797 B2
(45) Date of Patent: Aug. 4, 2015

(54) ANTENNA DEVICE AND RADAR APPARATUS

(75) Inventor: Akira Abe, Yokohama (JP)

(73) Assignee: Honda Elesys Co., Ltd., Kanagawa (JP)

(*) Notice: Subject to any disclaimer, the term of this patent is extended or adjusted under 35 U.S.C. 154(b) by 836 days.

(21) Appl. No.: 13/343,497

(22) Filed: Jan. 4, 2012

(65) Prior Publication Data

US 2012/0229362 A1    Sep. 13, 2012

(30) Foreign Application Priority Data

Jan. 7, 2011  (JP) ................ P2011-002123

(51) Int. Cl.
*H01Q 21/00*    (2006.01)
*G01S 13/34*    (2006.01)
*G01S 7/28*     (2006.01)
*G01S 13/93*    (2006.01)
*H01Q 21/06*    (2006.01)
*G01S 13/02*    (2006.01)

(52) U.S. Cl.
CPC ............ *G01S 13/345* (2013.01); *G01S 7/2813* (2013.01); *G01S 13/931* (2013.01); *H01Q 21/061* (2013.01); *G01S 2013/0245* (2013.01)

(58) Field of Classification Search
CPC  H01Q 1/3233; H01Q 21/0025; H01Q 25/008
USPC ......................................... 343/893, 753, 754
See application file for complete search history.

(56) References Cited

U.S. PATENT DOCUMENTS

| 2002/0021246 | A1* | 2/2002 | Martek et al. | 342/373 |
| 2010/0053025 | A1* | 3/2010 | Van Der Poel | 343/893 |
| 2010/0066631 | A1* | 3/2010 | Puzella et al. | 343/853 |
| 2010/0177012 | A1* | 7/2010 | Morrow | 343/893 |
| 2010/0302120 | A1* | 12/2010 | Crouch | 343/837 |

FOREIGN PATENT DOCUMENTS

| JP | 4-90608 A | 3/1992 |
| JP | 06-132717 | 5/1994 |
| JP | 3283589 B2 | 3/2002 |

OTHER PUBLICATIONS

Japanese Office Action issued in Japanese Patent Application No. 2011-002123 dated Jul. 1, 2014 (with translation).

* cited by examiner

*Primary Examiner* — Collin Dawkins
(74) *Attorney, Agent, or Firm* — Keating & Bennett, LLP

(57) ABSTRACT

An antenna device includes transmitting units each of which includes elements arranged parallel to a baseline, wherein the transmitting units are arranged side-by-side in a first direction and stepwisedly with steps in a second direction in a first region and a second region, the first direction being perpendicular to the baseline, the second direction being parallel to the baseline, the first region and the second region being partitioned by the baseline, and transmitting units positioned more remotely from the baseline being positioned further in the second direction.

9 Claims, 10 Drawing Sheets

ANTENNA DEVICE AND RADAR APPARATUS

CROSS-REFERENCE TO RELATED APPLICATIONS

Priority is claimed on Japanese Patent Application No. 2011-2123, filed Jan. 7, 2011, the contents of which are entirely incorporated herein by reference.

BACKGROUND OF THE INVENTION

1. Field of the Invention

The present invention relates to an antenna device and a radar apparatus which can detect a target using a reflected wave from a target (object) in response to radiated radio waves of 1 to 10 millimeters. Particularly, the present invention relates to an antenna device mounted on a DBF (Digital Beam Forming) radar apparatus.

2. Background Art

In order to guarantee driving safety of a vehicle, forward-looking on-board radar apparatuses detecting targets such as obstacles in the traveling direction (on the front side) or preceding vehicles have been developed. An on-board radar apparatus including plural receiving antennas and employing a process (DBF method) of phase-shifting and combining received signals from the receiving antennas is known. In order for the on-board radar apparatus to detect a target with high precision, it is desirable to reduce the beam width of a radio wave radiated when carrying out the DBF method and to thin the receiving characteristics of a reflected wave.

In general, in directional characteristics of an antenna in response to signals obtained by performing the DBF method, a component from the direction of a target plays a main role. The directional characteristic in this direction is referred to as a main beam. The directional characteristics of the signals radiated in the other directions are referred to as side lobes. The side lobes are not perfectly zero. In general, it is known that the side lobe can be reduced by increasing the number of elements in an antenna and unevenly arranging the elements.

For example, in the antenna device described in Japanese Patent No. 3283589 (Patent Document 1), an array including plural elements is partitioned into plural sub-arrays and the sub-arrays are formed in a stepped shape in the Y axis direction in which they are uneven in one direction, for example, in the X axis direction.

SUMMARY OF THE INVENTION

However, in the antenna device described in Patent Document 1, since all the sub-arrays each including plural elements are uneven in one direction, the width in the direction of unevenness markedly increases. Therefore, there is a problem in that the antenna device described in Patent Document 1 is not practical as an on-board radar apparatus requiring reduction in size.

The invention is made in consideration of the above-mentioned problem and provides an antenna device and a radar apparatus which have a small size and which can reduce the side lobes.

In order to achieve the above-mentioned object, a first aspect of the invention provides an antenna device including transmitting units each of which comprises elements arranged parallel to a baseline, wherein the transmitting units are arranged side-by-side in a first direction and stepwisedly with steps in a second direction in a first region and a second region, the first direction being perpendicular to the baseline, the second direction being parallel to the baseline, the first region and the second region being partitioned by the baseline, and transmitting units positioned more remotely from the baseline being positioned further in the second direction.

In the above antenna device, the transmitting units located in the first region and the transmitting units located in the second region may be in a mirror-image relationship in which an axis of symmetry is the baseline.

In the above antenna device, the steps may be equal to each other for the transmitting units located in at least one of the first region and the second region.

In the above antenna device, the steps may be smaller than an interval between adjacent elements in the transmitting units.

The above antenna device may further include receiving units each of which comprises elements arranged parallel to the baseline.

In the above antenna device, the steps between adjacent transmitting units, an interval between adjacent elements, a number of the elements included in each of receiving units, a number of the elements included in each of the transmitting units, and a stepwise arrangement number of the transmitting units may be determined so that an angle corresponding to a first null point defined by a stepwise arrangement of the transmitting units is a middle value of an angle corresponding to a first null point defined by the transmitting units and an angle corresponding to a first null point defined by the receiving units.

In the above antenna device, the steps between adjacent transmitting units, an interval between adjacent elements, a number of the elements included in each of receiving units, and a stepwise arrangement number of the transmitting units may be determined so that an angle corresponding to a first null point defined by a stepwise arrangement of the transmitting units and an angle corresponding to a first null point defined by the receiving units are not in an integer ratio relationship.

In the above antenna device, the steps between adjacent transmitting units, an interval between adjacent elements, a number of the elements included in each of transmitting units, and a stepwise arrangement number of the transmitting units may be determined so that an angle corresponding to a first null point defined by a stepwise arrangement of the transmitting units and an angle corresponding to a first null point defined by the transmitting units are not in an integer ratio relationship.

In the above antenna device, an interval between adjacent elements, a number of the elements included in each of receiving units, and a number of the elements included in each of transmitting units are determined so that an angle corresponding to a first null point defined by the receiving units and an angle corresponding to a first null point defined by the transmitting units are not in an integer ratio relationship.

A second aspect of the invention provides a radar apparatus including the above-mentioned antenna device.

According to the invention, since plural transmitting units are arranged in a stepped shape so as to be uneven in the same direction in the first region and the second region, it is possible to provide a small-size antenna device and a radar apparatus, which can prevent the width of the region having the transmitting units arranged therein from markedly increasing and which can reduce side lobes.

DETAILED DESCRIPTION OF THE INVENTION

First Embodiment

Figure 1:
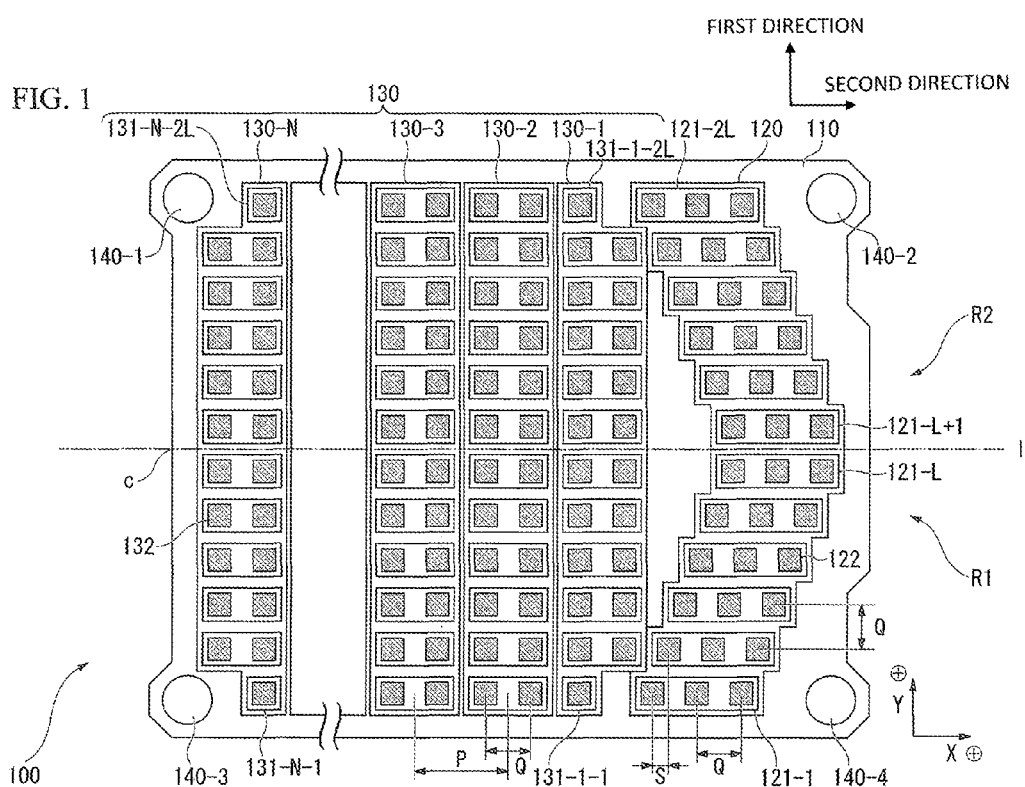
FIG. 1 is a diagram schematically illustrating the configuration of an antenna device 100 according to a first embodiment of the invention.

Hereinafter, an antenna device 100 according to a first embodiment of the invention will be described with reference to the accompanying drawings. FIG. 1 is a diagram schematically illustrating the constitution of the antenna device 100 according to the first embodiment. The antenna device 100 is, for example, an in-vehicle DBF radar apparatus. The antenna device 100 includes a panel 110, a transmitting unit 120 (i.e., transmitters), receiving parts 130 (i.e., receivers) (130-1 to 130-N, where N is a natural number equal to or greater than 1), and bolt holes 140 (140-1 to 140-4).

The panel 110 is formed of a substantially rectangular flat plate and the transmitting part 120 and the N receiving parts 130 (130-1 to 130-N) are mounted on the surface thereof.

The bolt holes 140-1 to 140-4 are arranged at four corners of the front panel 110. That is, in the antenna device 100, the bolt holes 140-1 to 140-4 can be arranged in a space in which the radiation elements are not arranged on the panel 110 and it is thus possible to effectively utilize a limited space.

Bolts are inserted into the bolt holes 140-1 to 140-4, respectively, and the panel 110 is pressed and attached to a chassis of a radar apparatus. By locating the bolt holes 140-1 to 140-4 at four corners of the panel 110 in this way, it is possible to guarantee the mechanical strength against vibration from the outside.

By matching the size of the chassis of the radar apparatus with the outermost size of the panel 110, that is, the antenna device 100, it is possible to reduce the area occupied by the radar apparatus to be as small as possible.

The transmitter unit 120 includes 2L transmitting units 121-1 to 121-2L (wherein L is a natural number equal to or greater than 2 and is 5 in the example shown in FIG. 1). The half L of the number of transmitting units 2L is referred to as a step-like arrangement number. Each transmitting unit 121-$n$ (1≤n≤2L) includes I radiation elements 122 (where I is a natural number equal to or greater than 2 and is 3 in the example shown in FIG. 1) and the I radiation elements are arranged with an element pitch Q (the distance between the centers of the adjacent elements) in the X direction (the lateral direction) in FIG. 1. Accordingly, the distance between the radiation element at one end and the radiation element at the other end in each transmitting unit is (I−1)·Q and the length of each transmitting unit in the X direction is substantially I·Q.

In order to achieve a superior directional characteristic of the antenna device 100, it is preferable that the radiation elements be densely arranged. However, when the element pitch Q is excessively small, the radiation elements are mutually coupled, thereby lowering the performance thereof. An appropriate element pitch Q is, for example, about 0.9λ (where λ represents a wavelength).

The transmitting units 121-1 to 121-2L are arranged with a step S smaller than the element pitch Q in the X direction so as to be adjacent to each other in the Y direction (in the example shown in FIG. 1, the pitch between the adjacent transmitting units (the inter-center distance) is Q which is equal to the element pitch Q) perpendicular to the X direction. The transmitting units 121-1 to 121-2L are arranged symmetrically (in a mirror-image relationship) with a line parallel to the X direction as an axis of symmetry 1 (baseline of which the Y coordinate is c). As shown in FIG. 1, when the region of which the Y coordinates are smaller than c is defined as a first region R1 and the region of which the Y coordinates are greater than c is defined as a second region R2, the first region R1 and the second region R2 are partitioned by the axis of symmetry 1, the transmitting units 121-1 to 121-L are arranged in the first region R1, and the transmitting units 121-2L to 121-L+1 are arranged in the second region R2. The X coordinates of the transmitting units 121-1 to 121-L are the same as the X coordinates of the transmitting units 121-2L to 121-L+1 arranged at the symmetric positions thereof. The transmitting units 121-1 to 121-L are arranged in parallel to the Y direction in the first region R1 and are arranged in a stepped shape with a step S between the adjacent transmitting units so as to be more uneven in the −X direction the farther they get from the axis of symmetry 1 (baseline). The transmitting units 121-2L to 121-L+1 are arranged in parallel to the Y direction in the second region R2 and are arranged in a stepped shape with a step S between the adjacent transmitting units so as to be positioned further in the −X direction as they are positioned more remotely from the axis of symmetry 1 (baseline).

The receiving parts 130-$k$ (1≤k≤N) each include 2L receiving units 131-$k$-1 to 131-$k$-2L and are arranged sequentially adjacently (at intervals, that is, with an inter-center distance, of P) in the X direction on the panel 110. The 2L receiving units 131-$k$-1 to 131-$k$-2L included in each receiving part 130-$k$ are sequentially adjacent to each other in the Y direction with a pitch Q in the state where the coordinates in the X direction are set to the same. Each receiving unit 131-$k$-$n$ (1≤n≤2L) includes J (where J is a natural number equal to or greater than 2 and is 2 in the example shown in FIG. 1) radiation elements 132 and the J radiation elements 132 are arranged with an element pitch Q in the X direction (in the lateral direction) in FIG. 1. Accordingly, the distance in the X direction between the radiation element at one end and the radiation element at the other end of each receiving unit is (J−1)·Q and the length in the X direction of each receiving unit is substantially J·Q.

In the antenna device 100, the receiving units 131-1-1 and 131-1-2L each have only one radiation element and are arranged in the state where the X coordinates at the left end thereof are parallel to the adjacent receiving units 131-1-2 and 131-1-2L-1. Accordingly, the left end of the transmitting part 120 is disposed to protrude to the left from the right end of the receiving part 130.

The receiving units 131-N-1 and 131-N-2L each have only one radiation element and are arranged in the state where the X coordinates at the right end thereof are parallel to the adjacent receiving units 131-N-2 and 131-N-2L-1. Accordingly, the right ends of the bolt holes 140-1 and 140-3 are disposed to protrude to the right from the left end of the receiving part.

Accordingly, it is possible to suppress the excessive increase in the lateral width of the antenna device 100 and thus to further reduce the size of the antenna device 100.

When the antenna device 100 is used for an on-board radar, it is thought that the integral between the adjacent receiving parts 130-$k$ is preferably set to 2λ more or less (about 3.9 mm at a frequency band of 76 GHz which is used for an in-vehicle millimeter wave radar). When the element pitch Q is set to about 0.9λ, it means that J is set to 2. This is intended to achieve a balance between a merit that the scanning beam width decreases as the interval between the receiving parts increases by increasing the number of receiving parts so as to guarantee the resolution and a demerit that the hardware scale excessively increases with the increase in the number of receiving parts or the increase in the interval between the receiving parts.

In general, the directional characteristic A(θ) of an array antenna including plural radiation elements is expressed by the following expression.

$$A(\theta)=F(\theta)\cdot I(\theta) \quad (1)$$

Here, θ is an angle from the front-surface direction (the direction perpendicular to the radiation surface). F(θ) represents an array effect indicating the effect due to the arrangement of the radiation elements 132. I(θ) represents the directional characteristics of the radiation elements. For example, when the radiation elements 132 are half-wavelength dipoles, the directivity of the electric field surface is the maximum in the direction (θ=0) parallel to the elements and is zero in the direction (θ=π/2) perpendicular to the elements.

In an array in which I radiation elements are arranged in one direction (for example, in the X direction) at identical intervals Q and are supplied with identical power in an identical phase, the array effect $F_q(\theta)$ can be expressed by the following expression.

$$F_q(\theta)=\sin(\pi IQ \sin \theta/\lambda)/\sin(\pi Q \sin \theta/\lambda) \quad (2)$$

Here, λ represents a wavelength. In Expression 2, F(θ) is expressed as a Fourier series having sin(θ) as a variable and is a periodic function having λ/Q as a period. θ making $F_q(\theta)$ to be zero, that is, a null point $\theta_{nt}$ defined by the transmitting units, is expressed approximately by the following expression.

$$\theta_{nt} \approx \frac{i\lambda}{IQ} \quad (3)$$

Here, i is a natural number of 1 to I−1. That is, the number of null points $\theta_{nt}$ defined by the transmitting units is I−1. In this way, the characteristic $F_q(\theta)$ which can be obtained by spatially distributing the plural elements is referred to as an array effect. Therefore, the array effect of each transmitting unit 121 including I radiation elements arranged with an identical pitch Q in the X direction is $F_q(\theta)$.

The transmitting part 120 shown in FIG. 1 can be considered as an array in which the transmitting units 121-1 to 121-2L are arranged in the X direction so as to be uneven by a step S and the step-like arrangement number in the Y direction is L. The array effect $F_s(\theta)$ defined by the step-like arrangement of the transmitting units is expressed by the following expression.

$$F_s(\theta)=\sin(\pi LS \sin \theta/\lambda)/\sin(\pi S \sin \theta/\lambda) \quad (4)$$

The null point $\theta_{ns}$ defined by the step-like arrangement is expressed approximately by the following expression.

$$\theta_{ns} \approx \frac{l\lambda}{LS} \quad (5)$$

Here, l is a natural number of 1 to L−1. That is, the number of null points $\theta_{ns}$ defined by the step-like arrangement is L−1.

The array effect $F_r(\theta)$ due to the receiving units 131-1-1 to 131-N-2L each including J radiation elements arranged with an identical pitch Q in the X direction is expressed by the following expression.

$$F_r(\theta)=\sin(\pi JQ \sin \theta/\lambda)/\sin(\pi Q \sin \theta/\lambda) \quad (6)$$

The null point $\theta_{nr}$ defined by the receiving units is expressed approximately by the following expression.

$$\theta_{nr} \approx \frac{j\lambda}{JQ} \quad (7)$$

Here, j is a natural number of 1 to J−1. That is, the number of null points $\theta_{nr}$ defined by the receiving units is J−1.

Accordingly, the array effects in transmission and reception of the antenna device 100 are $F_q(\theta)$, $F_s(\theta)$, and $F_r(\theta)$.

Expressions (2), (4), and (6) indicate that as I (the number of radiation elements of each transmitting unit), L (the step-like arrangement number), and J (the number of radiation elements of each receiving unit) become larger, the array effect in a region other than the region of θ=0, that is, the side lobes, can be further reduced. However, in this case, the computational load increasing with the increase in the number of radiation elements or the increase in area of the antenna device 100 is caused, which is not realistic.

Therefore, when the relationship of I, L, J, Q (element pitch), and S (difference in level between transmitting units) is determined so that the null point $\theta_{nt}$ defined by the transmitting units, the null point $\theta_{ns}$ defined by the step-like arrangement, and the null point $\theta_{nr}$ defined by the receiving units are dispersed in as wide an angle range as possible, it is possible to reduce the side lobes. Specifically, in the relationship of the transmitting units and the receiving units, the relationship of I, J, and Q is determined so that the first null point ($\theta_{nt}=\lambda/(I\cdot Q)$) defined by the transmitting units and the first null point ($\theta_{nr}=\lambda/(J \cdot Q)$) defined by the receiving units do not have the integer ratio relationship. Since λ, is a common multiplier factor in these two types of null points, the reciprocal 1/(I·Q) of the product (the length in the X direction of each transmitting unit) of the number of radiation elements of each transmitting unit and the element pitch and the reciprocal 1/(J·Q) of the product (the length in the X direction of each receiving unit) of the number of radiation elements of each receiving unit and the element pitch have only to be set not to have the integer ratio relationship. That is, (J·Q)/(I·Q) or (I·Q)/(J·Q) is set to be a value other than an integer value. In the embodiment, since the element pitches in the transmitting units and the receiving units are Q which is common, J/I or I/J has only to be set not to have an integer value. Accordingly, it is possible to reduce the overlap of the null points $\theta_{nt}$ defined by the transmitting units and the null points $\theta_{nr}$ defined by the receiving units. For example, I=3 and J=2 are set.

Figure 3:
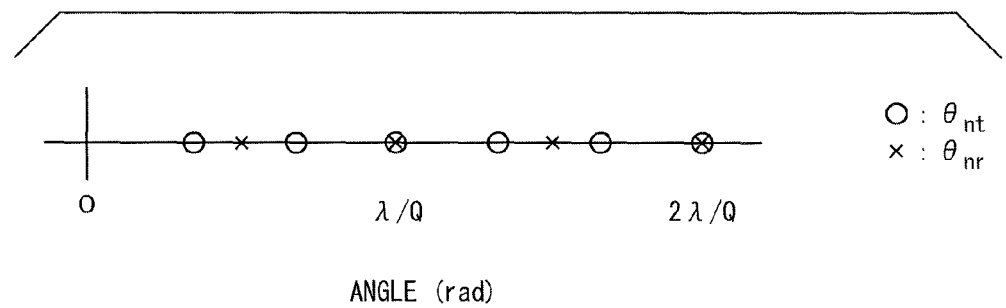
FIG. 3 is a diagram illustrating an example of the distribution of null points $\theta_{nt}$ defined by transmitting units and null points $\theta_{nr}$ defined by receiving units in the first embodiment.

Here, the distribution of the null points $\theta_{nt}$ defined by the transmitting units and the null points $\theta_{nr}$ defined by the receiving units when I=3 and J=2 are set is shown in FIG. 3. FIG. 3 is a diagram illustrating an example of the distribution of the null points $\theta_{nt}$ defined by the transmitting units and the null points $\theta_{nr}$ defined by the receiving units in the first embodiment. In FIG. 3, the horizontal axis represents an angle (in radians). In FIG. 3, the null points $\theta_{nt}$ defined by the transmitting units are marked by o and the null points $\theta_{nr}$ defined by the receiving units are marked by x. At this time, the first null point $\lambda/(J \cdot Q)$ defined by the transmitting units is $\lambda/2Q$ and is 1.5 times the first null point $\lambda/(I \cdot Q)$ defined by the receiving units, that is, $\lambda/3Q$, which does not cause an integer ratio relationship. The angles θ at which the null points $\theta_{nt}$ defined by the transmitting units and the null points $\theta_{nr}$ defined by the receiving units overlap with each other are $\lambda/Q$, $2\lambda/Q$, . . . , and the like, and the null points overlapping with the null points $\theta_{nr}$ defined by the receiving units out of the null points $\theta_{nt}$ defined by the transmitting units are only a part, and the null points $\theta_{nt}$ defined by the transmitting units and the null points $\theta_{nr}$ defined by the receiving units are dispersed.

Figure 4:
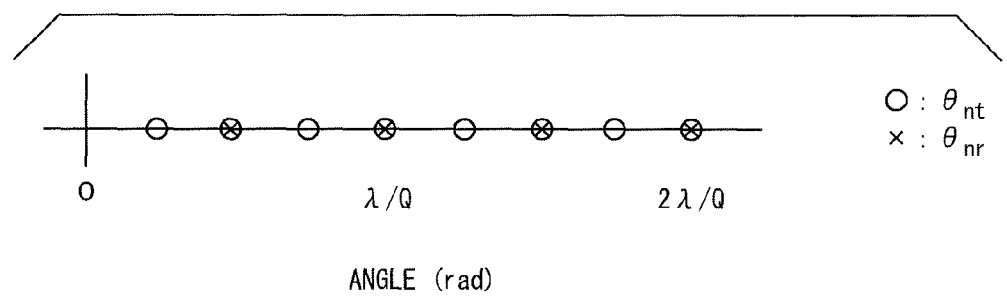
FIG. 4 is a diagram illustrating an example of the distribution of null points $\theta_{nt}$ by transmitting units and null points $\theta_{nr}$ defined by receiving units, which are not based on the first embodiment.

The distribution of the null points $\theta_{nt}$ defined by the transmitting units and the null points $\theta_{nr}$ defined by the receiving units when I=4 and J=2 are set unlike the first embodiment is shown in FIG. 4. FIG. 4 is a diagram illustrating an example of the distribution of the null points $\theta_{nt}$ defined by the transmitting units and the null points $\theta_{nr}$ defined by the receiving units unlike the first embodiment. In FIG. 4, the horizontal axis represents an angle (in radians). In FIG. 4, the null points $\theta_{nt}$ defined by the transmitting units are marked by o and the null points $\theta_{nr}$ defined by the receiving units are marked by x. At this time, the first null point $\lambda/(J \cdot Q)$ defined by the transmitting units is $\lambda/2Q$ and is 2 times the first null point $\lambda/(I \cdot Q)$ defined by the receiving units, that is, $\lambda/2Q$, which causes an integer ratio relationship. The angles θ at which the null points $\theta_{nt}$ defined by the transmitting units and the null points $\theta_{nr}$ defined by the receiving units overlap with each other are $\lambda/Q$, $\lambda/Q$, . . . , and the like, and all the null points $\theta_{nr}$ defined by the receiving units overlap with the null points $\theta_{nt}$ defined by the transmitting units. In this case, the overlap of the null points is remarkable even when the larger number of radiation elements than that in FIG. 3 is used.

In order to disperse the null points $\theta_{nt}$ defined by the transmitting units, the null points $\theta_{ns}$ defined by the step-like arrangement, and the null points $\theta_{nr}$ defined by the receiving units in a wide angle range, regarding the relationship of the transmitting units, the receiving units, and the step-like arrangement, the relationship of I, J, L, Q, and S is determined so that the first null points ($\theta_{ns}=\lambda/(L \cdot S)$) defined by the step-like arrangement is a value between the first null points ($\theta_{nt}=\lambda/(I \cdot Q)$) defined by the transmitting units and the first null points ($\theta_{nr}=\lambda/(J \cdot Q)$) defined by the receiving units and preferably an average value thereof. Since λ is a common multiplier factor in such null points, the reciprocal 1/(L·S) of the product (the total unevenness of the transmitting units) of the step-like arrangement number L and the step S has only to be set to a value between the reciprocal 1/(I·Q) of the product (the length in the X direction of each transmitting unit) of the number of radiation elements of each transmitting unit and the element pitch and the reciprocal 1/(J·Q) of the product (the length in the X direction of each receiving unit) of the number of radiation elements of each receiving unit and the element pitch, and preferably an intermediate value therebetween (see Expression (8)). At this time, the null points $\theta_{ns}$ defined by the step-like arrangement can reduce the overlap of the null points $\theta_{nt}$ defined by the transmitting units and the null points $\theta_{nr}$ defined by the receiving units.

$$\frac{1}{LS} = \frac{1}{2}\left(\frac{1}{IQ} + \frac{1}{JQ}\right) \quad (8)$$

More preferably, regarding the relationship of the step-like arrangement and the transmitting units, the relationship of I, L, S, and Q is determined so that the first null points ($\theta_{ns}=\lambda/(L \cdot S)$) defined by the step-like arrangement and the first null points ($\theta_{nt}=\lambda/(I \cdot Q)$) defined by the transmitting units do not have the integer ratio relationship. That is, the reciprocal 1/(L·S) of the product of the step-like arrangement number L and the step S and the reciprocal 1/(I·Q) of the product of the number of radiation elements of each transmitting unit and the element pitch should not have the integer ratio relationship. Accordingly, it is possible to reduce the overlap of the null points $\theta_{ns}$ defined by the step-like arrangement and the null points $\theta_{nt}$ defined by the transmitting units.

Regarding the relationship of the step-like arrangement and the receiving units, the relationship of J, L, S, and Q is determined so that the first null points ($\theta_{ns}=\lambda/(L \cdot S)$) defined by the step-like arrangement and the first null points ($\theta_{nr}=\lambda/(J \cdot Q)$) defined by the receiving units do not have the integer ratio relationship. That is, the reciprocal 1/(L·S) of the product of the step-like arrangement number L and the step S and the reciprocal 1/(J·Q) of the product of the number of radiation elements of each receiving unit and the element pitch should not have the integer ratio relationship. Accordingly, the overlap of the null points $\theta_{ns}$ defined by the step-like arrangement and the null points $\theta_{nr}$ defined by the receiving units is reduced to the minimum.

Figure 5:
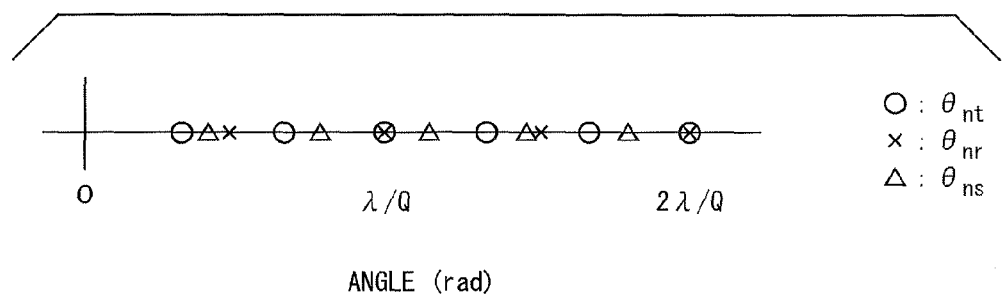
FIG. 5 is a diagram illustrating an example of the distribution of the null points $\theta_{nt}$ by transmitting units, null points $\theta_{nr}$ defined by receiving units, and null points $\theta_{ns}$ defined by a step-like arrangement in the first embodiment.

For example, when I=3, J=2, and L=6 are set, S=0.4Q is obtained through the use of Expression (8). The distribution of the null points $\theta_{nt}$ defined by the transmitting units, the null points $\theta_{nr}$ defined by the receiving units, and the null points $\theta_{ns}$ defined by the step-like arrangement in this case is shown in FIG. 5. FIG. 5 is a diagram illustrating an example of the distribution of the null points $\theta_{nt}$ defined by the transmitting units, the null points $\theta_{nr}$ defined by the receiving units, and the null points $\theta_{ns}$ defined by the step-like arrangement in the first embodiment. In FIG. 5, the horizontal axis represents an angle (in radians). In FIG. 5, the null points $\theta_{nt}$ defined by the transmitting units are marked by o, the null points $\theta_{nr}$ defined by the receiving units are marked by x, and the null points $\theta_{ns}$ defined by the step-like arrangement are marked by Δ. Accordingly, the overlap of the null points $\theta_{ns}$ defined by the step-like arrangement with the null points $\theta_{nt}$ defined by the transmitting units or the null points $\theta_{nr}$ defined by the receiving units is suppressed.

Figure 6:
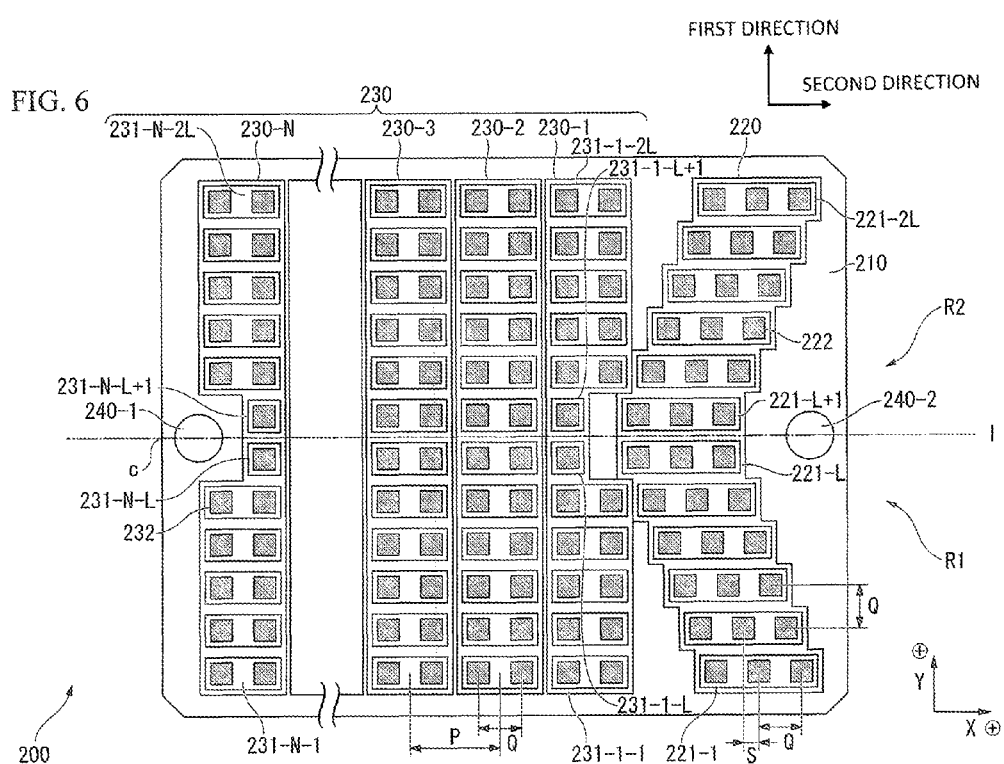
FIG. 6 is a diagram schematically illustrating the constitution of an antenna device 200 which is another example of the first embodiment.

An antenna device 200 which is another example of the first embodiment will be described below. FIG. 6 is a diagram schematically illustrating the constitution of the antenna device 200 according to another example of the first embodiment. In the antenna device 200, as shown in FIG. 6, the transmitting units 221-1 to 221-L are arranged in parallel to the Y direction in the first region R1 and are arranged in a stepped shape with a step S between the adjacent transmitting units so as to be positioned further in the +X direction as they are positioned more remotely from the axis of symmetry 1 (baseline). The transmitting units 221-2L to 221-L+1 are arranged in parallel to the Y direction in the second region R2 and are arranged in a stepped shape with a step S between the adjacent transmitting units so as to be positioned further in the +X direction as they are positioned more remotely from the axis of symmetry 1 (baseline). That is, in the antenna device 200, the direction in which the adjacent transmitting units are disposed unevenly along the X axis is the opposite of the direction in the antenna device 100 shown in FIG. 1.

The other constitutions and functions of the antenna device 200 shown in FIG. 6 are the same as in the antenna device 100 shown in FIG. 1.

Accordingly, the array effects of the antenna device 200 are $F_q(\theta)$, $F_s(\theta)$, and $F_r(\theta)$, similarly to the antenna device 100, and the null points $\theta_{nt}$ defined by the transmitting units, and the null points $\theta_{nr}$ defined by the receiving units, and the null points $\theta_{ns}$ defined by the step-like arrangement are the same. Therefore, the null points $\theta_{nt}$ defined by the transmitting units, and the null points $\theta_{nr}$ defined by the receiving units, and the null points $\theta_{ns}$ defined by the step-like arrangement are dispersed, thereby reducing the side lobes.

The antenna device 200 includes bolt holes 240-1 and 240-2 at the left end and the right end in the axis of symmetry 1 of the panel 210. That is, in the antenna device 200, the bolt holes 240-1 and 240-2 can be disposed in the space in which the radiation elements are not arranged on the panel 210. It is possible to prevent the excessive increase in size by effectively using the limited space.

In the antenna device 200, the receiving unit 231-N-L and 231-N-L+1 each include only one radiation element and are arranged in the state where the X coordinates at the right ends are parallel to the receiving units 231-N-L-1 and 231-N-L+2. Accordingly, the right end of the bolt hole 240-1 is disposed to protrude further to the right side from the left end of the receiving part 230.

The receiving unit 231-1-L and 231-1-L+1 each include only one radiation element and are arranged in the state where the X coordinates at the right ends are parallel to the receiving units 231-1-L-1 and 231-1-L+2. Accordingly, the left end of the transmitting part 220 is disposed to protrude further to the left side from the right end of the receiving part 230.

Accordingly, it is possible to prevent the excessive increase in the lateral width of the antenna device 200 and thus to further reduce the size of the antenna device 200.

Although it has been stated that the number of transmitting units 121 and 221 in the above-mentioned antenna devices 100 and 200 is 2L which is an even number, the number of transmitting units may be 2L-1 (where L is a natural number equal to or greater than 2) which is an odd number in the first embodiment. In this case, the transmitting units 121-1 to 121-L-1 and 121-L+1 to 121-2L-1 have only to be arranged to be symmetric about the axis of symmetry 1 passing through the transmitting unit 121-L. At this time, when power is supplied so that signals from the radiation elements included in the transmitting unit 121-L are double in strength the signals from the other radiation elements, the same array effects $F_q(\theta)$, $F_s(\theta)$, and $F_r(\theta)$ and the same null points $\theta_{nt}$, $\theta_{nr}$, and $\theta_{ns}$ as in the antenna device 100 can be achieved.

As a result, according to the first embodiment, even when many transmitting units and receiving units are not provided, it is possible to disperse the null points $\theta_{nt}$ defined by the transmitting units, the null points $\theta_{nr}$ defined by the receiving units, and the null points $\theta_{ns}$ defined by the step-like arrangement, thereby reducing the side lobes.

Although it has been stated in the above-mentioned antenna devices 100 and 200 that the step S between the adjacent transmitting units 121 and 221 is constant, the step S may vary depending on the adjacent transmitting units 121 and 221 in the first embodiment.

Although it has been stated that the power supplied to all the radiation elements of the transmitting units 121 and 221 and the receiving units 131 and 231 in the above-mentioned antenna devices 100 and 200 is constant, the power to be supplied may vary depending on the radiation elements.

In this case, according to the first embodiment, even when many transmitting units and receiving units are not provided, it is possible to disperse the null points $\theta_{nt}$ defined by the transmitting units, the null points $\theta_{nr}$ defined by the receiving units, and the null points $\theta_{ns}$ defined by the uneven structure, thereby reducing the side lobes.

Figure 7:
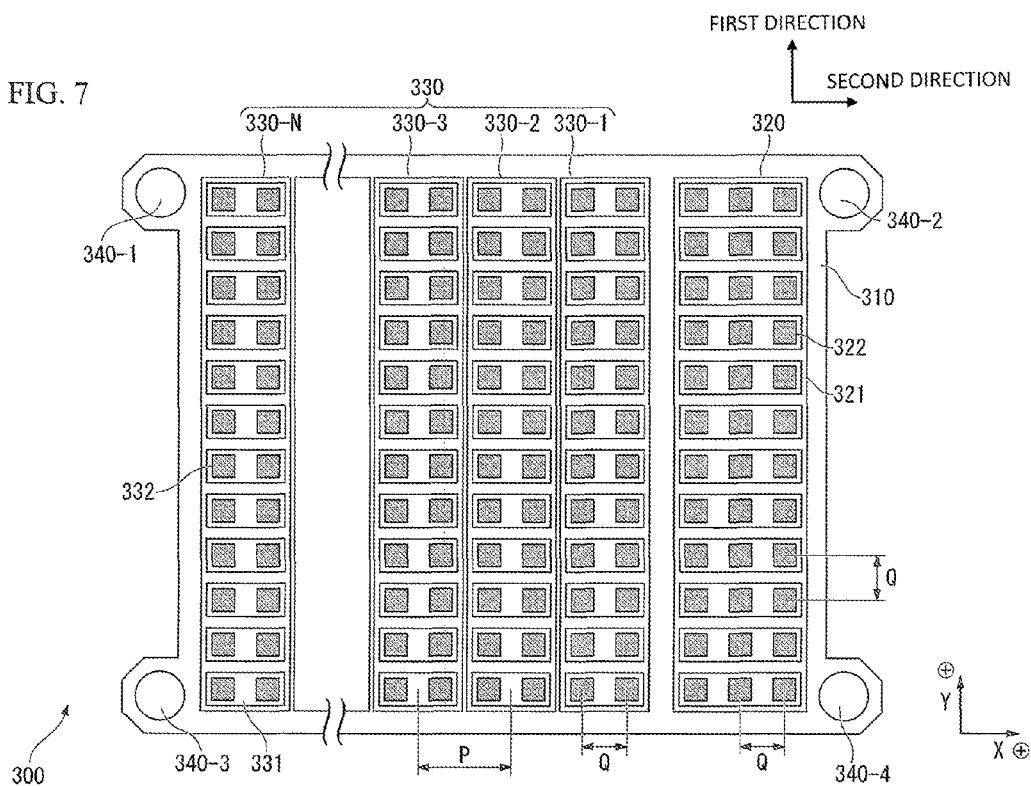
FIG. 7 is a diagram schematically illustrating the constitution of an antenna device 300 which is an example of the antenna device according to the background art.

For the purpose of comparison, the constitution of an antenna device 300 according to the background art will be described below with reference to FIG. 7. In the antenna device 300, as shown in FIG. 7, the constitution of the receiving parts 330 is the same as that of the receiving parts 130, but the transmitting units 321 constituting the transmitting part 320 are not uneven in the X direction and are arranged in parallel to the Y direction.

Figure 8:
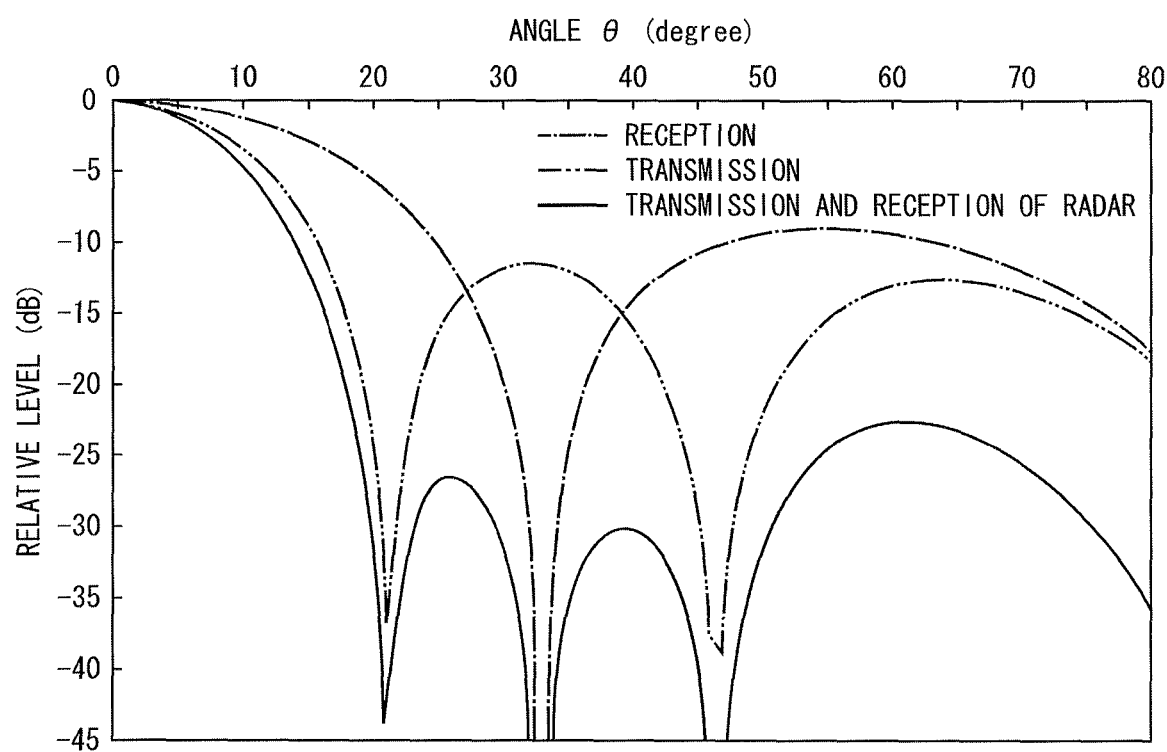
FIG. 8 is a diagram illustrating an example of the directional characteristic of the antenna device 300 which is an example of the antenna device according to the background art.

The directional characteristics of the antenna device 300 will be described with reference to FIG. 8. FIG. 8 is a diagram illustrating an example of the directional characteristics of the antenna device 300. In FIG. 8, the horizontal axis represents an angle θ and the vertical axis represents the relative level of which the value at θ=0 is 0 dB. In FIG. 8, the directional characteristic of the transmitting part 320 is indicated by a two-dot chained line, the directional characteristic of the receiving parts 330 is indicated by a one-dot chained line, and the directional characteristic of the antenna device 300 (transmission and reception of a radar) is indicated by a solid line.

In FIG. 8, the directional characteristic of the transmitting part 320 has a local maximum value −12 dB at θ=32° and a local maximum value −13 dB at θ=54°.

The directional characteristic of the antenna device 300 has a local maximum value −26 dB at θ=26°, a local maximum value −29 dB at θ=39°, and a local maximum value −23 dB at θ=60°.

Figure 9:
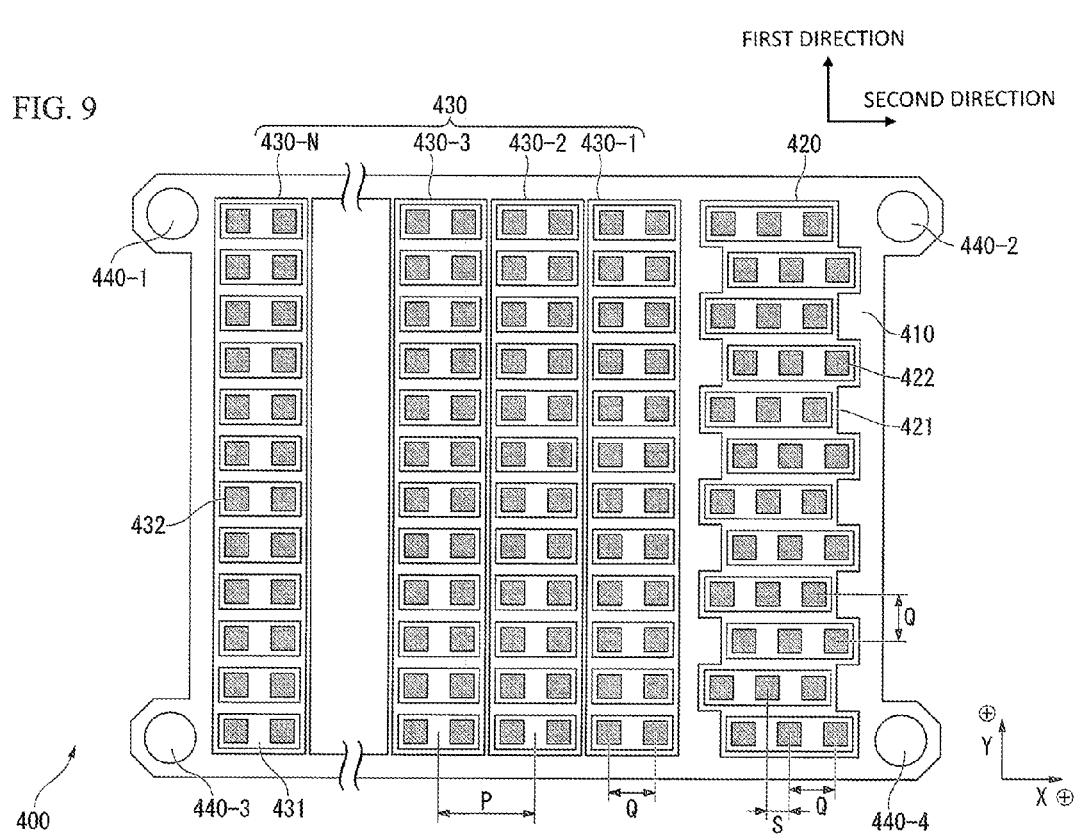
FIG. 9 is a diagram schematically illustrating the constitution of an antenna device 400 which is another example of the antenna device according to the background art.

The constitution of an antenna device 400 which is another example of the antenna device according to the background art will be described below with reference to FIG. 9. In the antenna device 400, as shown in FIG. 9, the constitution of the receiving parts 430 is the same as that of the receiving parts 130, but the transmitting units 421 constituting the transmitting part 420 are adjacent to each other in parallel to the Y direction with the unevenness direction along the X axis inverted for each line.

Figure 10:
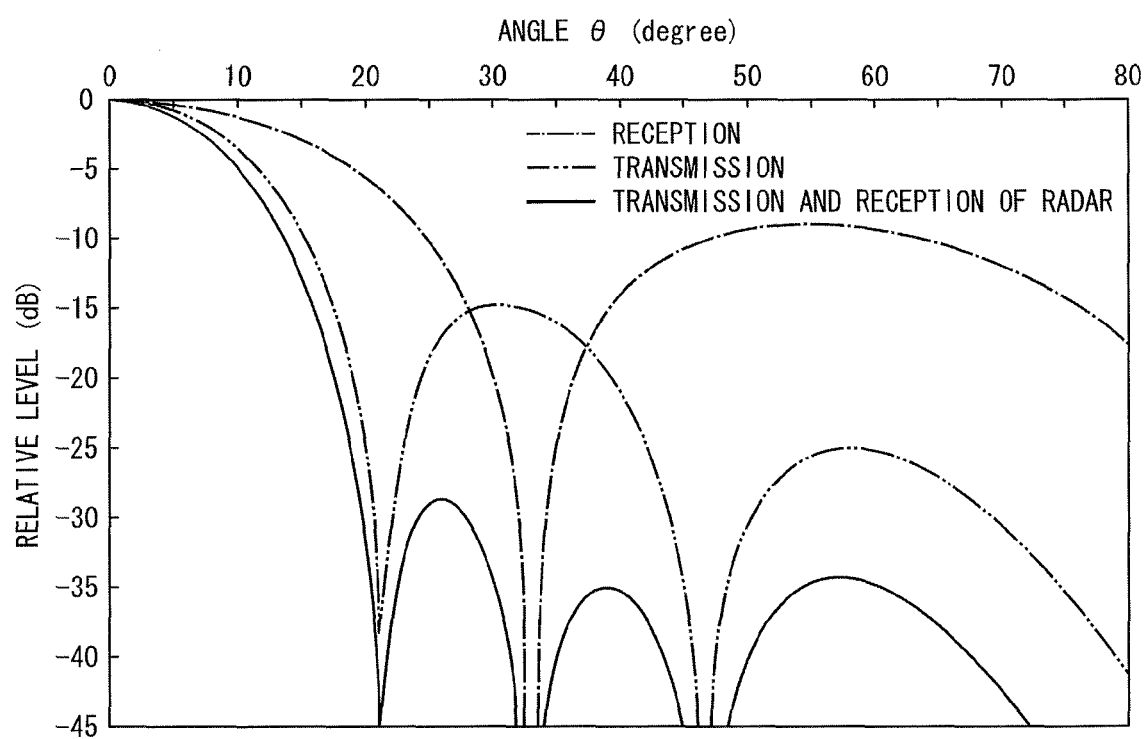
FIG. 10 is a diagram illustrating an example of the directional characteristic of the antenna device 400 which is another example of the antenna device according to the background art.

The directional characteristics of the antenna device 400 will be described with reference to FIG. 10. In FIG. 10, the horizontal axis represents an angle 8 and the vertical axis represents the relative level of which the value at θ=0 is 0 dB. In FIG. 10, the directional characteristic of the transmitting part 420 is indicated by a two-dot chained line, the directional characteristic of the receiving parts 430 is indicated by a one-dot chained line, and the directional characteristic of the antenna device 400 (transmission and reception of a radar) is indicated by a solid line.

In FIG. 10, the directional characteristic of the transmitting part 420 has a local maximum value −15 dB at θ=31° and a local maximum value −25 dB at θ=58°.

The directional characteristic of the antenna device 400 has a local maximum value −29 dB at θ=26°, a local maximum value −35 dB at θ=39°, and a local maximum value −34 dB at θ=57°.

Figure 2:
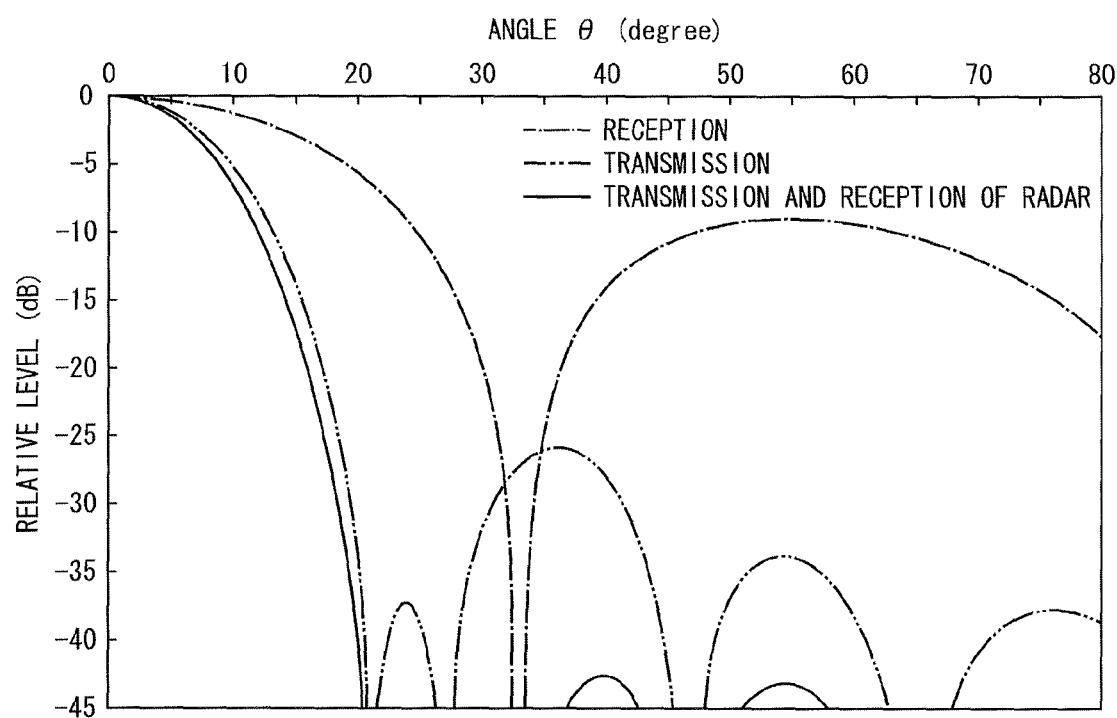
FIG. 2 is a diagram illustrating an example of the directional characteristic of the antenna device 100 according to the first embodiment.

On the other hand, the directional characteristics of the antenna device 100 according to the first embodiment are shown in FIG. 2. In FIG. 2, the horizontal axis represents an angle θ and the vertical axis represents the relative level of which the value at θ=0 is 0 dB. In FIG. 2, the directional characteristic of the transmitting part 120 is indicated by a two-dot chained line, the directional characteristic of the receiving parts 130 is indicated by a one-dot chained line, and the directional characteristic of the antenna device 100 is indicated by a solid line.

In FIG. 2, the directional characteristic of the transmitting part 120 has a local maximum value −37 dB at θ=24°, a local maximum value −26 dB at θ=36°, a local maximum value −34 dB at θ=54°, and a local maximum value −38 dB at θ=76°.

The directional characteristic of the receiving part 130 has a local maximum value −9 dB at θ=55°.

The directional characteristic of the antenna device 100 has a local maximum value −42 dB at θ=38° and a local maximum value −43 dB at θ=54°. In the directional characteristics of the antenna device 100, the relative level is less than −42 dB in the region in which θ is equal to or greater than 20°, which shows that the side lobes are satisfactorily reduced.

In this way, according to the first embodiment, it is possible to reduce side lobes while suppressing an increase in hardware scale such as the number of elements used for transmission and reception.

Second Embodiment

Figure 11:
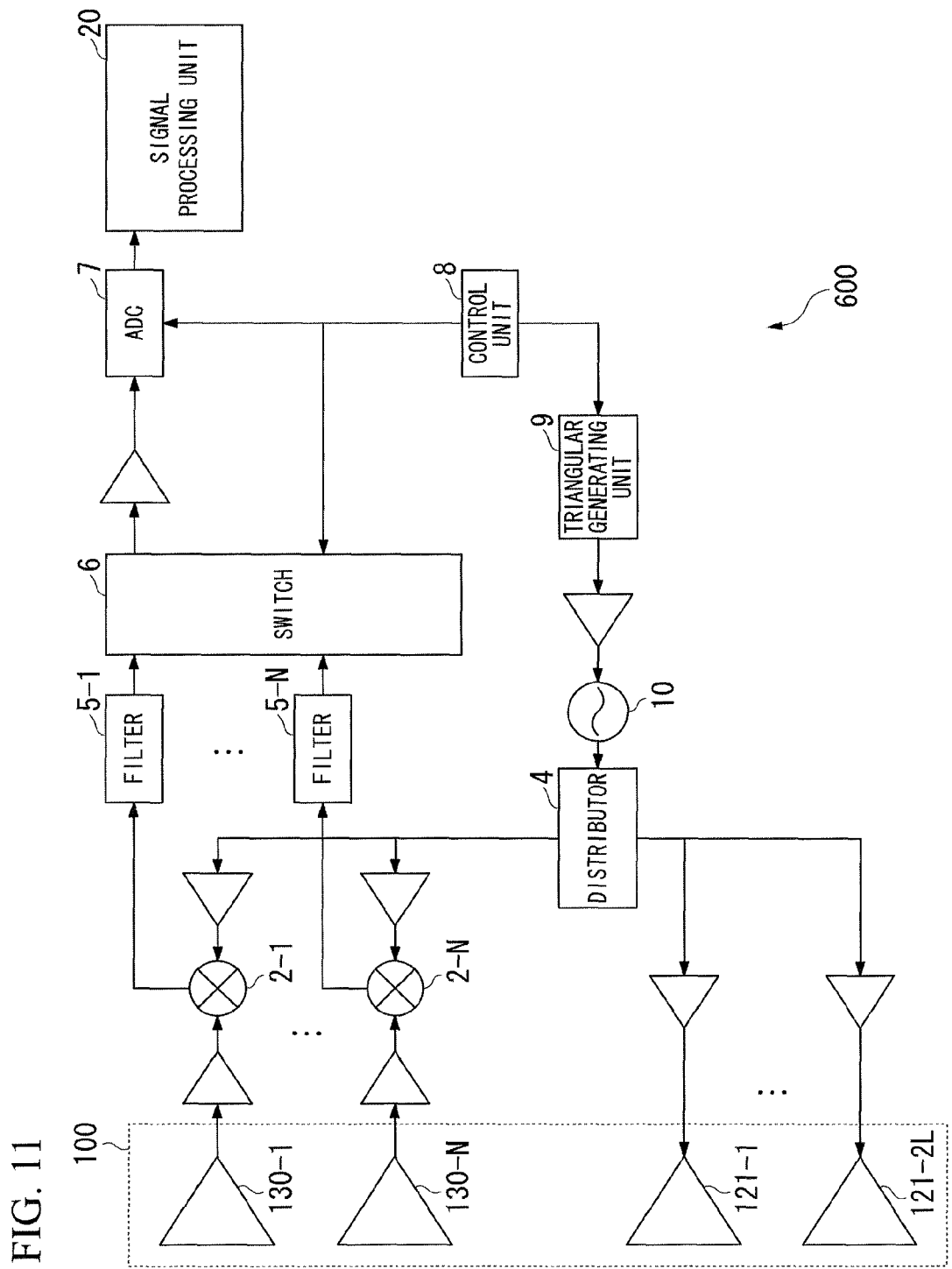
FIG. 11 is a diagram schematically illustrating the constitution of a radar apparatus 600 according to a second embodiment of the invention.

A second embodiment of the invention will be described below with reference to the accompanying drawings. FIG. 11 is a diagram schematically illustrating the configuration of a radar apparatus 600 according to the second embodiment of the invention. The radar apparatus 600 includes an antenna device 100, mixers 2-1 to 2-N, a distributor 4, filters 5-1 to 5-N (channel filters), a switch 6, an ADC 7 (A/D converter), a control unit 8, a triangular wave generating unit 9, a VCO 10 (Voltage-Controlled Oscillator), and a signal processing unit 20. In FIG. 11, the receiving parts 130-1 to 130-N and the transmitting units 121-1 to 121-2L out of the constituents of the antenna device 100 are shown.

The receiving parts 130-1 to 130-N receive reflected waves arriving from a target by reflecting transmitted waves from the target, converts the received reflected waves into received signals, and outputs the received signals to the mixers 2-1 to 2-N via an amplifier. In each receiving part, the received reflected waves are converted into received signals by the radiation elements of each receiving unit, each receiving unit adds the received signals, and the added reception signals of the receiving units are added and output to an amplifier.

The mixers 2-1 to 2-N mix the signals obtained by amplifying the transmitted waves from the transmitting units 121-1 to 121-2L and the received waves from the receiving parts 130-1 to 130-N through the use of the amplifier and generate beat signals (channels Ch1 to ChN) corresponding to the frequency differences. The mixers 2-1 to 2-N output the generated beat signals to the filters 5-1 to 5-N.

The filters 5-1 to 5-N limit bands of the beat signals input from the mixers 2-1 to 2-N and output the band-limited beat signals to the switch 6.

The switch 6 outputs the beat signals, the bands of which are limited by the filters 5-1 to 5-N, to the ADC 7 via an amplifier while sequentially switching the channels Ch1 to ChN in response to the sampling signal input from the control unit 8.

The ADC 7 converts the beat signals input from the switch 6 in an A/D (Analog-to-Digital) conversion manner to generate digital signals in synchronization with the sampling signal input from the control unit 8 and sequentially stores the digital signals in a waveform storage area of the memory 21 of the signal processing unit 20.

The control unit 8 is constructed by a microcomputer, a CPU (Central Processing Unit), or the like and controls the entire radar apparatus 600 on the basis of a control program stored in a ROM (not shown) or the like. The control unit 8 outputs the sampling signal, for example, to the switch 6, the ADC 7, and the triangular wave generating unit 9.

The triangular wave generating unit 9 generates a triangular wave signal in synchronization with the sampling signal input from the control unit 8 and outputs the generated triangular wave signal to the VCO 10 via an amplifier.

The VCO 10 frequency-modulates the triangular wave signal input from the triangular wave generating unit 9 via the amplifier to generate a transmitted signal and outputs the generated transmitted signal to the distributor 4.

The distributor 4 distributes the transmitted signal input from the VCO 10 to the mixers 2-1 to 2-N and the transmitting units 121-1 to 121-2L via an amplifier.

The transmitting units 121-1 to 121-2L transmit the transmitted signal output from the distributor and input via the amplifier as a transmitted wave to a target. Here, the radiation elements constituting each transmitting unit radiate the input transmitted signal as a transmitted wave.

Figure 12:
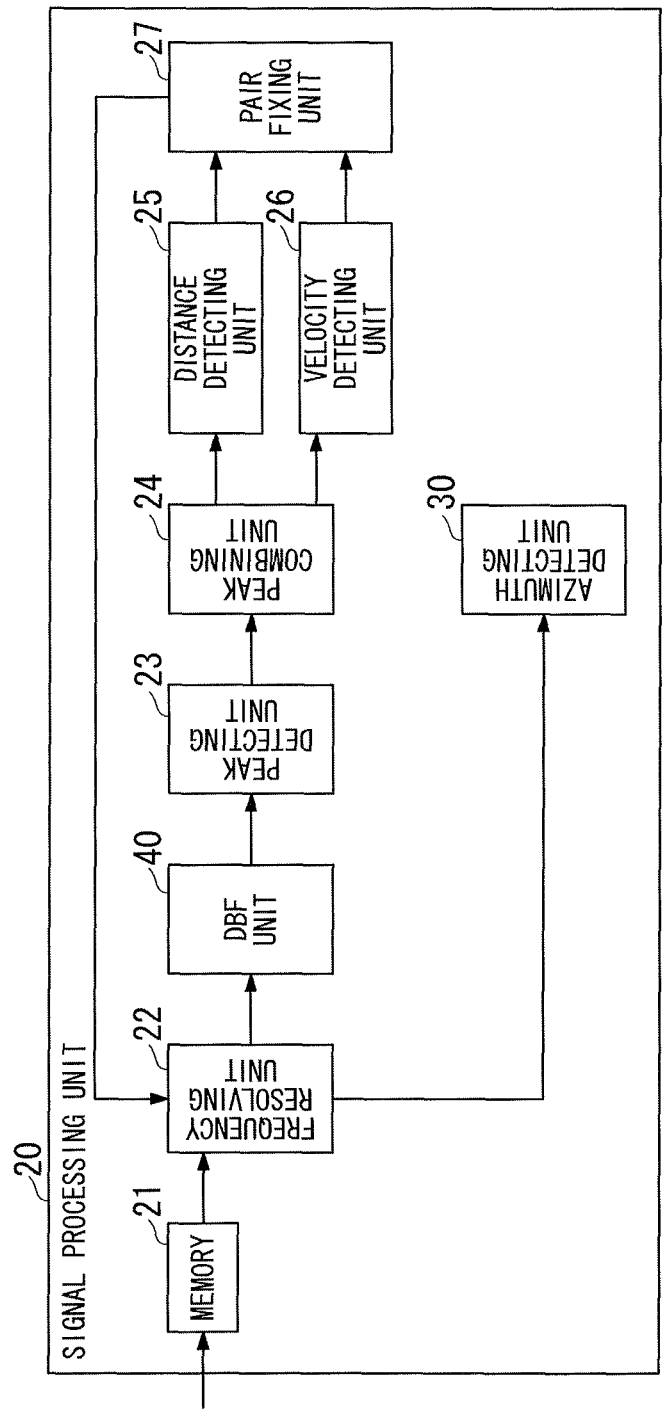
FIG. 12 is a diagram schematically illustrating the constitution of a signal processing unit 20 according to the second embodiment.

The constitution and process of the signal processing unit 20 according to the second embodiment of the invention will be described below with reference to a drawing. FIG. 12 is a diagram schematically illustrating the constitution of the signal processing unit 20 according to the second embodiment.

The signal processing unit 20 includes a memory 21, a frequency resolving unit 22, a peak detecting unit 23, a peak combining unit 24, a distance detecting unit 25, a velocity detecting unit 26, a pair fixing unit 27, an azimuth detecting unit 30, and a DBF (Digital Beam Forming) unit 40.

<Signal Process on Received Wave in Signal Processing Unit 20>

The memory 21 stores the digital signals input from the ADC 7 in the waveform storage area. The stored digital signals are time-series data (an ascending part and a descending part) of the channels Ch1 to ChN corresponding to the receiving parts 130-1 to 130-N. For example, the waveform storage area of the memory 21 stores 2×256×number of receiving parts 2N pieces of data, when 256 pieces of data are sampled from each of the ascending part and the descending part.

The frequency resolving unit 22 reads the time-series data of each channel from the memory 21, converts the read time-series data of each channel into frequency-component data with a predetermined resolution, and outputs the converted frequency-component data to the azimuth detecting unit 30 and the DBF unit 40. The process of converting the time-series data into the frequency-component data is performed, for example, through the use of a Fourier transform. Here, the frequency resolving unit 22 resolves the 256 pieces of sampled data of each of the ascending part and the descending part for each channel into 128 pieces of frequency-component data ((2(ascending part and descending part)×128×number of receiving parts 2N pieces of data) complex data).

Here, a phase difference depending on the position of each receiving part appears in the frequency-component data of the corresponding receiving part, but the absolute values (the reception intensity or the amplitude) of the data are substantially identical to each other.

The DBF unit 40 Fourier-transforms (that is, spatial-axis Fourier transforms) the input frequency-component data corresponding to the channels (receiving parts) in the arrangement direction of the receiving parts 130-1 to 130-N and generates spatial axis data.

The DBF unit 40 calculates spatial frequency-component data (complex data) for each angular channel which are quantized with a predetermined angular resolution on the basis of the generated spatial axis data and outputs the calculated spatial frequency-component data to the peak detecting unit 23 for each frequency.

The DBF unit 40 calculates both the frequency-component data and the spatial frequency-component data for each of the ascending region and the descending region of a triangular wave.

The spectrum indicated by the spatial frequency-component data for each angular channel output from the DBF unit 40 depends on the estimation of an arrival direction of a received wave based on a beam scanning resolution. Accordingly, since the radar apparatus 600 transmits and receives signals using the antenna device 100 with reduced side lobes, it is possible to estimate the arrival direction of the received wave with high precision without increasing the number of channels.

Since the frequency-component data of the angular channels are added through the use of the Fourier transform in the arrangement direction of the receiving parts, the S/N ratio is improved. Accordingly, it is possible to improve the detection precision of a peak value to be described later.

The peak detecting unit 23 detects the peaks of intensity (or amplitude) of each of the ascending region and the descending region of a triangular wave for each angular channel on the basis of the spatial frequency-component data for each angular channel input from the DBF unit 40. The peak detecting unit 23 detects beat frequencies having a peak value greater than a predetermined numeral value from the detected peaks and selects the detected beat frequencies as target frequencies.

Therefore, the peak detecting unit 23 detects the presence of a target depending on the distance at the beat frequencies of which the spectrum has a peak on the basis of the frequency spectrum of the frequency-component data of any one antenna or the added value of the frequency-component data of all the antennas. By adding the frequency-component data of all the antennas, the noise component is averaged and the S/N ratio is improved. The peak detecting unit 23 outputs the detected peak values of the channels and the beat frequencies thereof to the peak combining unit 24 for each angular channel. Here, in the case of the spatial-axis Fourier transform with A (for example, 16) angular frequencies, the number of angular channels is A-1 (for example, 15).

The peak combining unit 24 totally combines the beat frequencies of the ascending region and the descending region and the peak values thereof in a matrix shape on the basis of the beat frequencies and the peak values input from the peak detecting unit 23, that is, combines all the beat frequencies of the ascending region and the descending region, and sequentially outputs the combinations of the beat frequencies and the peak values thereof to the distance detecting unit 25 and the velocity detecting unit 26. That is, the peak combining unit 24 combines the peak values and the beat frequencies thereof in the ascending region and the peak values and the beat frequencies thereof in the descending region and outputs the combinations to the distance detecting unit 25, the velocity detecting unit 26, and the pair fixing unit 27 for each angular channel.

The distance detecting unit 25 calculates a distance r by the use of the following expression from the beat frequency fu in the ascending region and the beat frequency fd in the descending region input from the peak combining unit 24. The distance detecting unit 25 outputs the calculated distance r to the pair fixing unit 27.

$$r = \frac{CT}{2\Delta f} \frac{fu + fd}{2} \qquad (9)$$

Here, C represents the speed of light, $\Delta f$ represents the frequency modulation width of a triangular wave, and T represents the modulation time in the ascending region and the descending region.

The velocity detecting unit 26 calculates the relative velocity v to a target on the basis of the difference in beat frequency between the combination of the ascending region and the descending region input from the peak combining unit 24. The velocity detecting unit 26 outputs the calculated relative velocity v to the pair fixing unit 27.

The relative velocity v is calculated, for example, through the use of the following expression from the beat frequency fu in the ascending region and the beat frequency fd in the descending region.

$$v = \frac{C}{2f_0} \frac{fu - fd}{2} \qquad (10)$$

Here, $f_0$ represents the central frequency of a triangular wave.

The pair fixing unit 27 generates a table in which the distance r input from the distance detecting unit 25, the relative velocity v input from the velocity detecting unit 26, and the peak value of the ascending region and the peak value of the descending region input from the peak combining unit 24 are recorded for each combination of the peak of the ascending region and the peak of the descending region for each angular channel.

The pair fixing unit 27 selects an appropriate combination of the peak of the ascending region and the peak of the descending region corresponding to each target from the generated tables and outputs the distance r, the relative velocity v, and the frequencies having a peak value of the combination selected to correspond to each target to the frequency resolving unit 22.

Here, the pair fixing unit 27 selects, for example, a combination in which the difference between the beat frequency fu of the ascending region and the beat frequency fd of the descending region is equal to or less than a predetermined value or a combination in which the peak value of the ascending region and the peak value of the peripheral region thereof are equal to or less than a predetermined value as the appropriate combination for each angular channel. Considering that one target may exhibit a peak over plural angular channels with the DBF resolution, the pair fixing unit 27 may select an appropriate combination of the peak of the ascending region and the peak of the descending region in consideration that the difference in the distance r, the relative velocity v or the peak value between the adjacent angular channels is equal to or less than a predetermined value, that is, the degree of approximation.

The azimuth detecting unit 30 performs a spectrum estimating process, for example, using an AR (Auto-Regression) spectrum estimating method or a MUSIC (Multiple Signal Classification) method which is a high-resolution algorithm on the basis of the frequency-component data input from the frequency resolving unit 22 and determines the azimuth of the corresponding target on the basis of the estimated spectrum.

A configurational example in which the azimuth detecting unit 30 employs the AR spectrum estimating method will be described below.

The azimuth detecting unit 30 includes a normal equation creating unit 301, an AR coefficient calculating unit 302, a determination unit 303, and a power spectrum calculating unit 304.

The normal equation creating unit 301 creates a normal equation on the basis of the frequency-component data input from the frequency resolving unit 22. Here, the normal equation creating unit 301 creates a correlation matrix from the frequency-component data for each frequency (one or both of the ascending region and the descending region) and creates a normal equation on the basis of the created correlation matrix. The normal equation creating unit 301 outputs the created normal equation to the AR coefficient calculating unit 302. The normal equation creating unit 301 creates and outputs a second or higher order normal equation.

The AR coefficient calculating unit 302 solves the normal equation input from the normal equation creating unit 301 to calculate the AR coefficient and the variance $\sigma^2$ of white noise and outputs the calculated AR coefficient and the calculated variance of white noise to the determination unit 303.

The determination unit 303 receives the AR coefficient and the variance $\sigma^2$ of white noise from the AR coefficient calculating unit 302. The determination unit 303 determines the order to be referred to on the basis of the AR coefficients and the variances $\sigma^2$ of white noise calculated from different order normal equations. The determination unit 303 outputs the AR coefficient and the variance $\sigma^2$ of white noise corresponding to the determined order to the power spectrum calculating unit 304.

The power spectrum calculating unit 304 calculates a power spectrum on the basis of the AR coefficient and the variance $\sigma^2$ of white noise input from the determination unit 303 and calculates the arrival direction of the received wave on the basis of the calculated power spectrum.

As described above, the DBF unit 40 detects the presence and the azimuth of a target using the DBF method of improving the receiving sensitivity in the direction in which the received wave is received on the basis of the frequency-component data input from the frequency resolving unit 22. Accordingly, the azimuth detecting unit 30 can improve the estimation precision by performing the DBF method having a low resolution but providing a stable beam spectrum before performing the detection of an azimuth with a high resolution by itself.

The DBF unit 40 may output the azimuth information of each detected target to the azimuth detecting unit 30 and the azimuth detecting unit 30 may estimate the azimuth information using the logical product of the azimuth information estimated by itself and the azimuth information input from the DBF unit 40. Accordingly, it is possible to improve the estimation precision or the reliability.

In this way, according to the second embodiment, it is possible to suppress the increase in hardware scale such as the number of channels associated with transmission and reception and to improve the direction estimation precision of a target.

A part of the radar apparatus 600 according to the above-mentioned embodiments, such as the control unit 8 or the signal processing unit 20, may be embodied by a computer. In this case, the part may be embodied by recording a program for performing the control functions in a computer-readable recording medium and causing a computer system to read and execute the program recorded on the computer-readable recording medium. Here, the "computer system" is built in the radar apparatus and includes an OS or hardware such as peripherals.

Examples of the "computer-readable recording medium" include memory devices of portable mediums such as a flexible disk, a magneto-optical disc, a ROM, and a CD-ROM, a hard disk built in the computer system, and the like. The "computer-readable recording medium" may include a recording medium dynamically storing a program for a short time like a transmitting medium when the program is transmitted via a network such as the Internet or a communication line such as a telephone line and a recording medium storing a program for a predetermined time like a volatile memory in a computer system serving as a server or a client in that case. The program may embody a part of the above-mentioned functions. The program may embody the above-mentioned functions in cooperation with a program previously recorded in the computer system.

A part or all of the radar apparatus according to the above-mentioned embodiments may be embodied as an integrated circuit such as an LSI (Large Scale Integration). The functional blocks of the radar apparatus may be individually formed into processors and a part or all thereof may be integrated as a single processor. The integration technique is not limited to the LSI, but they may be embodied as a dedicated circuit or a general-purpose processor. When an integration technique taking the place of the LSI appears with the development of semiconductor techniques, an integrated circuit based on the integration technique may be employed.

While the embodiments of the invention have been described with reference to the accompanying drawings, specific constitutions thereof are not limited to the above-mentioned embodiments, but various modifications in design or the like may be made without departing from the scope of the invention.

What is claimed is:

1. An antenna device comprising:
   transmitters, each of which includes transmitter elements arranged parallel to a baseline, and
   receivers, each of which includes receiver elements arranged parallel to the baseline, wherein;
   the transmitters are arranged side-by-side in a first direction and stepwise with steps in a second direction in a first region and a second region, the first direction being perpendicular to the baseline, the second direction being parallel to the baseline, the first region and the second region being partitioned by the baseline, and the transmitters positioned more remotely from the baseline being positioned further in the second direction;
   a pitch by which the transmitter elements are arranged is equal to a pitch by which the receiver elements are arranged;
   when a number of the transmitter elements is I, a pitch by which the transmitter elements are arranged is Q, a pitch of the steps is S, a number of the transmitters is 2L, and a number of receiver elements is J, where S is smaller than Q, J is greater or equal to 2, L is greater or equal to 2, and JQ/IQ or IQ/JQ is set to be a value other than an integer value, any θns defined by Formula 1 is not equal to any θnr defined by Formula 2, or any θns defined by Formula 1 is not equal to any θnt defined by Formula 3:

$$\theta ns = l\lambda/LS \quad \text{[Formula 1]},$$

$$\theta nr = j\lambda/JQ \quad \text{[Formula 2], and}$$

$$\theta nt = i\lambda/IQ \quad \text{[Formula 3]},$$

where λ is a wavelength of a transmitter frequency or a receiver frequency of the antenna device and l, j, and i are natural numbers from 1 to L-1, J-1 and I-1.

2. The antenna device according to claim 1, wherein the transmitters located in the first region and the transmitters located in the second region are in a mirror-image relationship in which an axis of symmetry is the baseline.

3. The antenna device according to claim 1, wherein the steps are equal to each other for the transmitters located in at least one of the first region and the second region.

4. The antenna device according to claim 1, wherein the steps are smaller than an interval between adjacent transmitter elements in the transmitters.

5. The antenna device according to claim 1, wherein the steps between adjacent ones of the transmitters, an interval between adjacent ones of the elements of the transmitters, a number of the receiver elements included in each of the receivers, a number of the transmitter elements included in each of the transmitters, and a stepwise arrangement number of the transmitters are determined so that an angle corresponding to a first null point defined by a stepwise arrangement of the transmitters is a middle value of an angle corresponding to a first null point defined by the transmitters and an angle corresponding to a first null point defined by the receivers.

6. The antenna device according to claim 1, wherein the steps between adjacent ones of the transmitters, an interval between adjacent ones of the elements in the transmitters, a number of the receiver elements included in each of the receivers, and a stepwise arrangement number of the transmitters are determined so that an angle corresponding to a first null point defined by a stepwise arrangement of the transmitters and an angle corresponding to a first null point defined by the receiving units are not in an integer ratio relationship.

7. The antenna device according to claim 1, wherein the steps between adjacent ones of the transmitters, an interval between adjacent ones of the elements in the transmitters, a number of the transmitter elements included in each of the transmitters, and a stepwise arrangement number of the transmitters are determined so that an angle corresponding to a first null point defined by a stepwise arrangement of the transmitters and an angle corresponding to a first null point defined by the transmitters are not in an integer ratio relationship.

8. The antenna device according to claim 1, wherein an interval between adjacent ones of the transmitter elements of the transmitters, a number of the receiver elements included in each of the receivers, and a number of the elements included in each of the transmitters are determined so that an angle corresponding to a first null point defined by the receivers and an angle corresponding to a first null point defined by the transmitters are not in an integer ratio relationship.

9. A radar apparatus comprising the antenna device according to claim 1.

* * * * *